United States Patent [19]

Rizk et al.

[11] Patent Number: 4,473,886

[45] Date of Patent: Sep. 25, 1984

[54] DATA PROCESSING APPARATUS WITH ALGEBRAIC MEMORY OPERATION AND ENTRY SEQUENCE

[75] Inventors: Samir W. Rizk; David Caldwell, both of Lubbock, Tex.

[73] Assignee: Texas Instruments Incorporated, Dallas, Tex.

[21] Appl. No.: 280,640

[22] Filed: Jul. 6, 1981

[51] Int. Cl.³ .................... G06F 7/38; G06F 15/02
[52] U.S. Cl. ................................................. 364/709
[58] Field of Search .................... 364/709, 200, 900

[56] References Cited

U.S. PATENT DOCUMENTS

| | | | |
|---|---|---|---|
| 3,487,369 | 12/1969 | King et al. | 364/200 |
| 3,839,630 | 10/1974 | Olander, Jr. et al. | 364/709 |
| 3,914,587 | 10/1975 | Haines | 364/709 |
| 3,983,380 | 9/1976 | Sharif et al. | 364/709 |
| 3,996,562 | 12/1976 | Reach et al. | 364/200 |
| 4,099,246 | 7/1978 | Osborne et al. | 364/709 |
| 4,208,720 | 6/1980 | Harrison | 364/709 |

*Primary Examiner*—David H. Malzahn
*Attorney, Agent, or Firm*—René E. Grossman; Leo Heiting; Melvin Sharp

[57] ABSTRACT

A data processing apparatus having a plurality of preprogrammed functional operations and at least one user accessible memory includes a generalized input sequence for combining functional operations with data storage in one of the user accessible memories. In the case where a number of user accessible memories is provided, memory entry is enabled by a store input followed by an input designating the memory while a memory recall operation is enabled by a recall input followed by a memory designation input. The algebraic memory operation and entry sequence requires entry of the store input, the desired operation input and the memory designation input. If a unary operation is selected, the selected operation is performed on the data stored in the output indicator memory or alternately on the data stored in the designated memory and the result is stored in the designated memory. If a binary operation is selected, the selected operation is performed using the data stored in the designated memory as the first operand and the data stored in the output indicator memory as the second operand, and the result is stored in the designated memory. With modifications this entry sequence can also be used to perform combined operations and memory entry for an apparatus having only one user accessible memory.

15 Claims, 6 Drawing Figures

DATA PROCESSING APPARATUS WITH ALGEBRAIC MEMORY OPERATION AND ENTRY SEQUENCE

BACKGROUND OF THE INVENTION

The present invention relates to data processing apparatuses which include preprogrammed functions and at least one user accessible memory. This combination of functional capability is most often found in the so called "scientific" calculators. These calculators generally include a wide variety of functions in addition to the four basic arithmetic operational functions of addition, subtraction, multiplication and division. These machines typically include a keyboard for entering information and operational commands into the machine and a visual display for communicating an indication of the results to the operator. These machines often include one or more user accessible memories. A user accessable memory is a data memory which the operator can selectively address for both storing and recalling data. Typically only a single keystroke is necessary for either storing or recalling data in the case in which a single user accessable memory is provided and a two keystroke sequence including some means to designate the particular memory addressed is employed in a machine which uses a plurality of user accessible memories.

A problem exists with this type of calculator organization. Often it is desirable to complete an operation on a displayed value and store that value in memory or to combine a displayed value with a stored value and to store the result in the same memory. This kind of function is useful when it is desirable to compute and store or compute, store and accumulate intermediate products of a lengthy or complicated mathematical expression.

It is known in the prior art to provide a dedicated input key for combining the completion of an operational command and storage within a user accessable memory. Thus previous calculators have included M+ keys for adding the displayed value into a user accessible memory or M− keys for subtracting the displayed value from the user accessible memory. Some machines go one step further by providing a SUM/PROD key which when used in conjunction with a second function or shift key and an inverse operation key is employed to provide combined operations and memory entry for each of the four basic arithmetic operations. Even with the use of a single key in conjunction with a second function key and an inverse key it is necessary to provide a particular dedicated key or key sequence for each of the operations to be combined with the memory entry. In addition it is not the usual practice to employ such combined operation and memory entry keys for single operand functions such as the trigonometric functions of sine, cosine and tangent. Therefore, this solution to the problem is less than completely satisfactory in many instances because it requires use of an additional key or keystroke sequence for each operation to be combined with memory entry thereby cutting down the number of available keys or keystroke sequences for other operations. This requirement for additional keys or keystroke sequences becomes a problem as the calculators themselves are being assembled in smaller and smaller packages with less and less space for any required entry keys.

SUMMARY OF THE INVENTION

It is an object of the present invention to provide a generalized operating sequence for combining the completion of an arithmetic operation with the storage of the result in a user's selected memory. This invention is most applicable to scientific calculators which employ a plurality of user accessible memories.

It is a further object of the present invention to enable a plurality of combinations of arithmetic operations and memory entry, limited only by the number of normally provided preprogrammed operations which are available to the user.

In the preferred embodiment of the present invention an algebraic memory and entry sequence includes the entry of a store input, the entry of a preprogrammed operation input and the entry of an input designating the particular memory in which the result is to be stored. This technique is equally applicable to unary operations, that is operations which require only a single operand, and to binary operations, that is operations which require two operands.

According to a preferred embodiment of this invention, the use of a unary operation input in the above described entry sequence results in the calculator performing the selected unary operation on the currently displayed value or on the value in the designated memory and entering the result into the user accessible memory designated. The selection of one of these two memories to supply the operand is a design choice.

According to another preferred embodiment of the present invention, when a binary operation is input in the above described entry sequence the calculator performs the entered binary operation using the data stored in the designated user accessible memory as the first operand and the data currently displayed as the second operand. The results of this calculation are entered into the designated user accessible memory.

According to another aspect of the present invention the above described entry sequence is modified to be applicable to calculators having only a single user accessible memory. In such a machine according to one embodiment the entry sequence comprises a function control input, the desired operation input and the store input. According to another method for applying this technique to a single user accessible memory machine, the normal entry sequence is altered so that upon actuation of a store input the data displayed is stored in the user accessible memory if the previously received input was a data input, and the operation is performed in the manner set forth above and the result stored in the user accessible memory if the input received immediately prior to the store input is an the operation input.

BRIEF DESCRIPTION OF THE DRAWINGS

The above and other objects and further aspects of the present invention will become clear from the following description taken in conjunction with the drawings, in which:

FIG. 3 (shown in parts 3a and 3b) illustrates a flow chart of the operation of a data processing apparatus in accordance with the present invention which has a plurality of user accessible memories;

DETAILED DESCRIPTION OF THE PREFERRED EMBODIMENT

Figure 1:
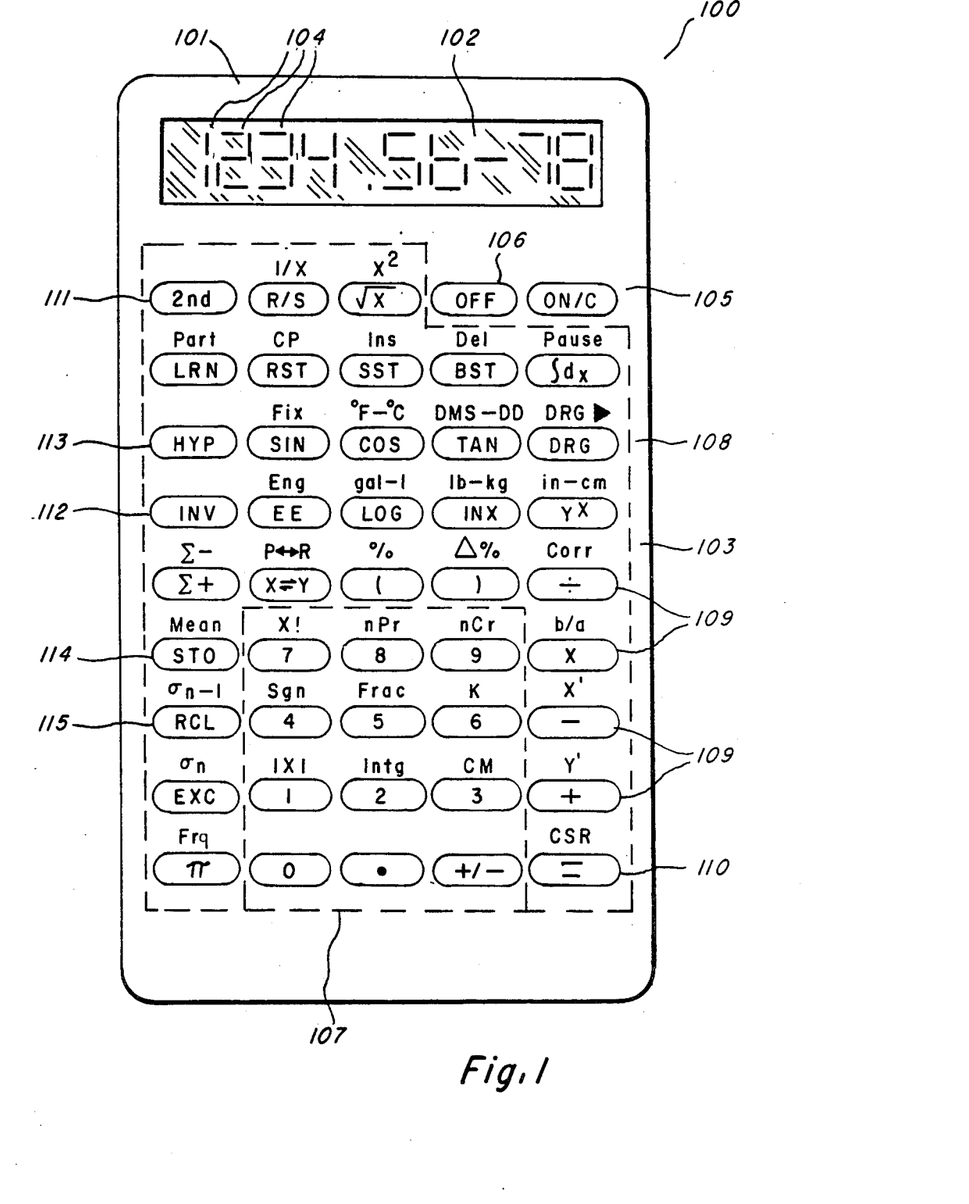
FIG. 1 illustrates the front panel of a data processing apparatus in accordance with the present invention.

FIG. 1 illustrates the front panel of the case of a data processing apparatus which is the subject of the present application. As illustrated this data processsing apparatus is conventionally known as a scientific calculator. The name scientific calculator applies generally to hand-held or desk top machines which perform mathematical operations on inputs from a keyboard and which supply a visual display of the results.

FIG. 1 shows the front panel of data processing apparatus 100 which illustrates substantially all of the machine/user interface components. Data processing apparatus 100 includes case 101, display 102 and keyboard 103.

Display 102 includes a plurality of seven segment digits 104. The digits 104 are primarily employed to provide a visual output of the numerical results calculated by the machine. In addition, a data processing apparatus of this type typically also generates an output indication of input data as it is input and may also indicate the operational state of the machine. Such indications commonly include whether one of the function control keys has been depressed, the current angular calculation mode of the machine and may also include some indication of an error condition for an unpermitted input sequence or operation.

User input of data and operational commands to the data processing apparatus is made by a keyboard 103. Keyboard 103 is made up of a plurality of momentary contact key switches, each of these key switches having a predefined function. On/Clear key 105 is employed to turn the data processing apparatus on if the apparatus is turned off. If the apparatus is turned on, On/Clear key 105 functions to clear the numer displayed by display 102 in order to enable input of new numerical data or in order to enable input of corrected numerical data in the case that the operator makes a mistaken entry. Off key 106 is employed to turn data processing apparatus 100 off.

Keyboard 103 includes a plurality of numerical input keys 107. These numerical input keys 107 include the decimal digits 0 to 9, a decimal point and a sign control key. Together these 12 keys are employed to enter numerical data into the machine to provide the required operands for the mathematical functions to be performed.

Keyboard 103 further includes a plurality of operational/functional command keys 108. Operational/functional command keys 108 enable the user to input to the machine commands for performing the desired operations and functions. Operational/functional command keys 108 include the basic functions of addition, subtraction, multiplication and division indicated by the basic function keys 109. Operation and function command keys 108 also includes an equal sign key 110 which enables completion of an entered algebraic expression, thereby commanding the machine to compute the desired result from the entered data and the entered commands. Typically, data processing apparatus 100 includes a plurality of other operational/functional command keys 108 such as illustrated for performing a variety of other types of calculations.

Operational/functional command keys 108 may include a plurality of data processing control operational command keys. These keys are employed to change the meaning of depression of particular keys to command operations differing from the primary operations. These data processing control command keys may include second key 111, inverse key 112, and hyper key 113. The second key 111 is employed to designate a secondary function for at least some of the other keys of keyboard 103. As illustrated in FIG. 1, a significant number of the keys of keyboard 103 have a primary function indicated on the key and a secondary function indicated on the display panel above the key. The second key 111 is employed to designate the secondary function for the next depressed key. Inverse key 112 is employed to change the next depressed operational/functional command key 108 to the inverse of the primary operation. As an example, the inverse key 112 could change the meaning of the depression of a logarithm key from the calculation of a logarithm to the calculation of an exponential. The inverse key 112 might also be employed in conjunction with the trigonometric function keys to input a command such as calculation of the arc sine, arc cosine or arc tangent. Generally the inverse key 112 can properly be used to redefine the operation of fewer of the keys 108 than the second key 111. Hyperbolic key 113 may also be employed as a data processing control command key. Use of hyperbolic key 113 in conjunction with the ordinary circular trigonometric functions of sine, cosine and tangent would change the meaning of these commands to the calculation of the hyperbolic sine, hyperbolic cosine and hyperbolic tangent, respectively. Generally the operation of even fewer keys can be redefined by employing hyperbolic key 113 than by employing inverse key 112.

A further subset of command keys 108 control the storage and recall of data from the user accessible memories. Store key 114 and recall key 115 are typical of the type of input commands employed for this purpose. In a data processing apparatus having only a single user accessible memory, depression of the store key 114 would store data corresponding to the currently displayed data in the user accessible memory. In such a machine, depression of the recall key 115 would recall the data stored in the memory and display it via display 102. In the case of a data processing apparatus having a plurality of user accessible memories a memory designation must follow each memory store and recall operation. In the data processing apparatus 100 illustrated in FIG. 1, designation of the particular user accessible memory desired is via numerical keys 107. Thus, by depressing the store key 114 and the numerical key 5 the currently displayed data would be stored in the memory designated by 5. Similiarly, depression of recall key 115 followed by depression of numerical key 3 would result in the recall and display of the data stored in the memory designated 3. It should be understood that other data processing apparatuses may employ a plurality of alphabetic keys (such as A, B, C, D, etc.) to designate the particular user accessible memory addressed. The present invention is equally applicable to the case in which alphabetic memory designator keys are employed.

Figure 2:
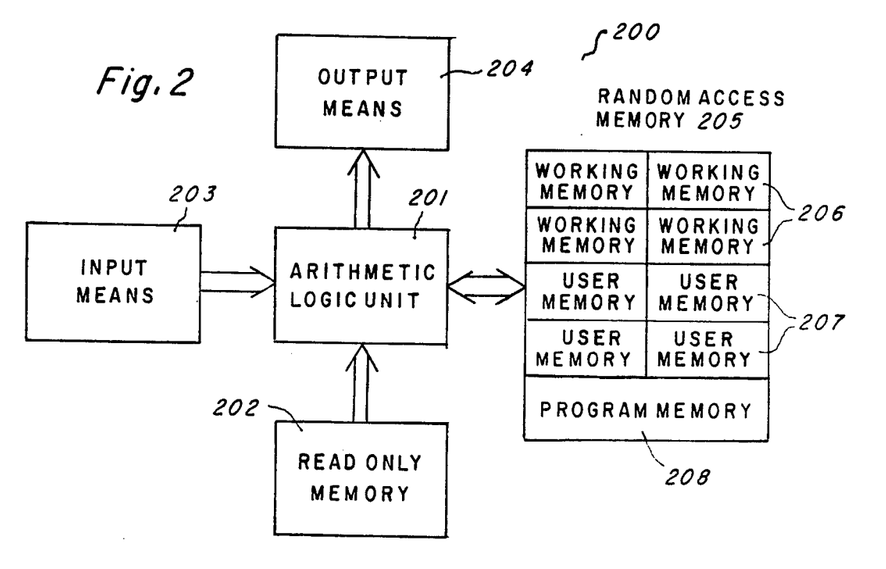
FIG. 2 illustrates a block diagram of the circuitry employed in a data processing apparatus in accordance with the present invention.

FIG. 2 illustrates a block diagram of data processing apparatus 200 which may be used to embody the present invention. Central to the functioning of data processing apparatus 200 is arithmetic logic unit 201. Arithmetic logic 201 performs all of the computation and control functions necessary for the operation of data processing apparatus 200. The operation of arithmetic logic unit 201 is controlled by a read only memory 202 in conjunction with data and command inputs from input means 203. Input means 203 is typically embodied by keyboard 103 illustrated in FIG. 1. Read only memory 202 preferably includes a plurality of instruction words which are sequentially applied to arithmetic logic unit 201 thereby causing it to perform desired operations. These desired operations typically include so called "overhead" functions. These overhead functions would typically include periodically checking the condition of input means 203 to determine whether an input signal is generated, decoding any received input signal to determine the next operation to be performed, and generation of signals for output via output means 204. Output means 204 is typically embodied by display 102 illustrated in FIG. 1. The instruction words stored in read only memory 202 are generally in machine code, that is each instruction word commands arithmetic logic unit 201 to perform a single simple operation. Groups of instruction words are read out of read only memory 202 in accordance with the particular inputs received from input means 203 to cause arithmetic logic unit 201 to perform each of the functions of the command keys 108 illustrated in FIG. 1. In performing these commanded functions arithmetic logic unit 201 sends data to random access memory 205 for storage therein and retrieves data previously stored in random access memory 205 for operation thereon. In accordance with the groups of instruction words stored in read-only memory 202 arithmetic logic unit 201 addresses various portions of random access memory 205. Thus random access memory 205 is partitioned into several types of memory units in accordance with the instructions of read-only memory 202.

Random access memory 205 includes a plurality of working memories 206 which are employed to store the pending operands applied to arithmetic logic unit 201, an indication of entered but unperformed commands and various calculated intermediate values. Working memories 206 may also be used as address pointers to store the address of particular instruction words in read only memory 202. This use would typically include the storage of the address of a return point in read only memory 202 during execution of a subroutine. Typically one of the working memories 206 is employed to store the data which is output via output means 204. This is accomplished by read only memory 202 commanding arithmetic logic unit 201 to read out the data stored in this particular working memory and to apply appropriate signals to output means 204 to cause output means 204 to generate an indication of this data.

In the data processing apparatus 200 of the present invention random access memory 205 also includes at least one user accessible memory 207. As explained above in conjunction with the description of the operation of store key 114 and recall 115, upon entry of appropriate inputs from input means 203, read-only memory 202 causes arithmetic logic unit 201 to transfer data from the working memory 206 associated with the output and a selected one of the user accessible memories 207.

Random access memory 205 may also include a program memory 208. Program memory 208 is employed for storing a set of a plurality of input commands from input means 203. This set of input commands is stored in programmed memory 208 by the user by selection of appropriate input commands from input means 203 in order to enable the data processing apparatus 200 to perform a user selected series of commands. Typically the program steps stored in program memory 208 each correspond to one of the command keys 108 which generate the input signals from input means 203. Thus each of these program steps in program memory 208 selects a group of instruction words in read only memory 202 for applying the desired instructions to arithmetic logic unit 201 in order to perform the selected function.

By adopting this form of construction, data processing apparatus 200 becomes in effect a miniature programmed digital computer. By proper selection of the instruction words permanently stored in read only memory 202 during the manufacture of the data processing apparatus 200, the manufacturer may provide a selected group of preprogrammed functions which are enabled by proper inputs from input means 203. Because a typical data processing apparatus 200 has arithmetic logic unit 201, read only memory 202 and random access 205 embodied in a single integrated circuit chip, the instruction words stored in read only memory 202 may be changed by changing a single manufacturing step in the integrated circuit construction. Thus an entirely new data processing apparatus 200 may be constructed which performs an entirely new set of functions without the necessity for completely redesigning the generalized computer like structure of the apparatus.

The operation of the data processing apparatus of the present invention will now be described in conjunction with the flow charts illustrated in FIGS. 3, 4 and 5. It is understood that these flow charts illustrate the general steps in the operation of data processing apparatus 200 and are not intended to illustrate the exact programs stored in read only memory 202. It should be understood that one skilled in the art of design of such data processing apparatuses would be able to provide the proper exact program to be stored in read only memory 202 to perform the functions illustrated in the flow charts of FIGS. 3, 4 and 5 once selection is made of the particular arithmetic logic unit 201 to be employed with its particular instruction set.

Figure 3A:
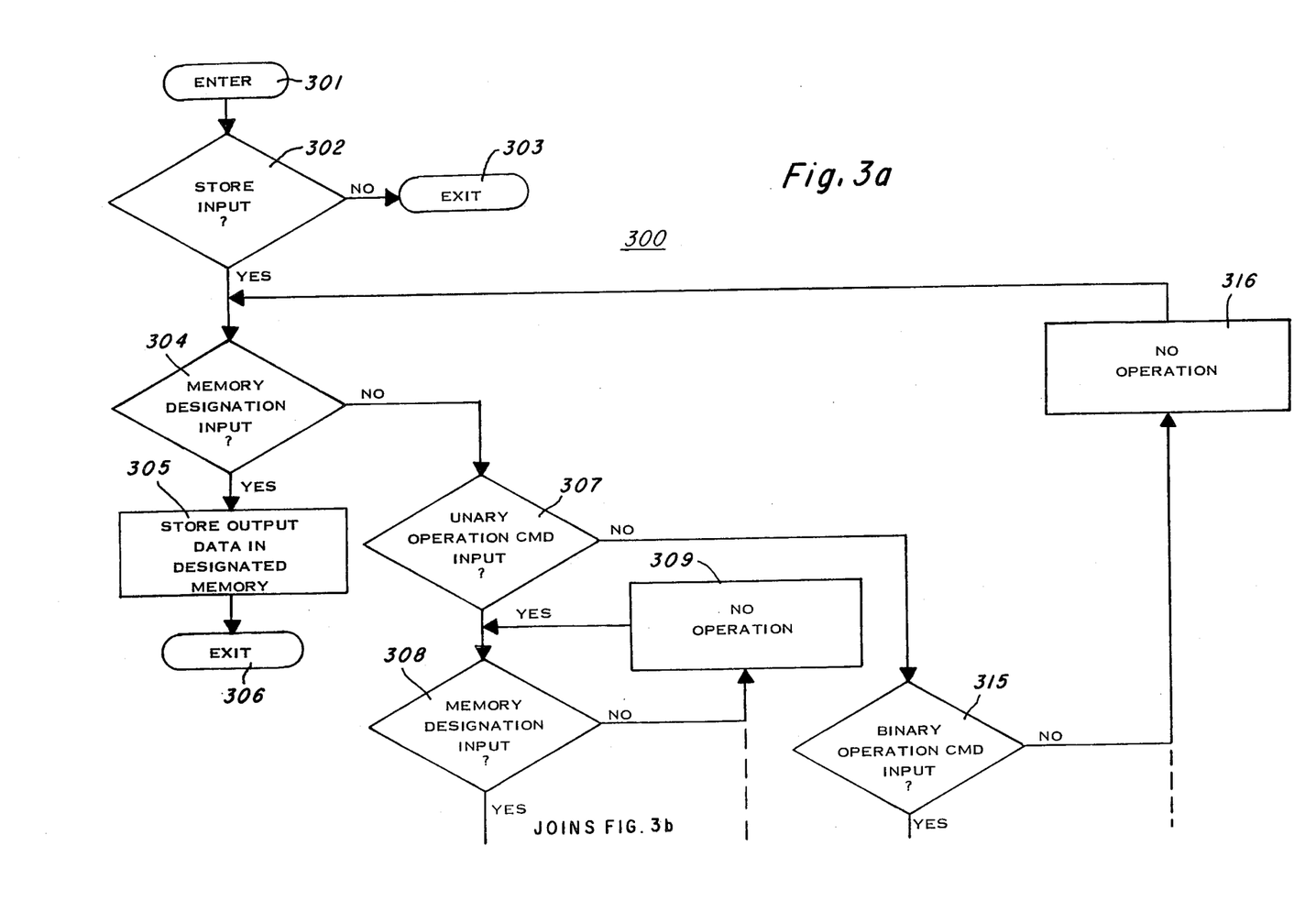
Figure 3B:
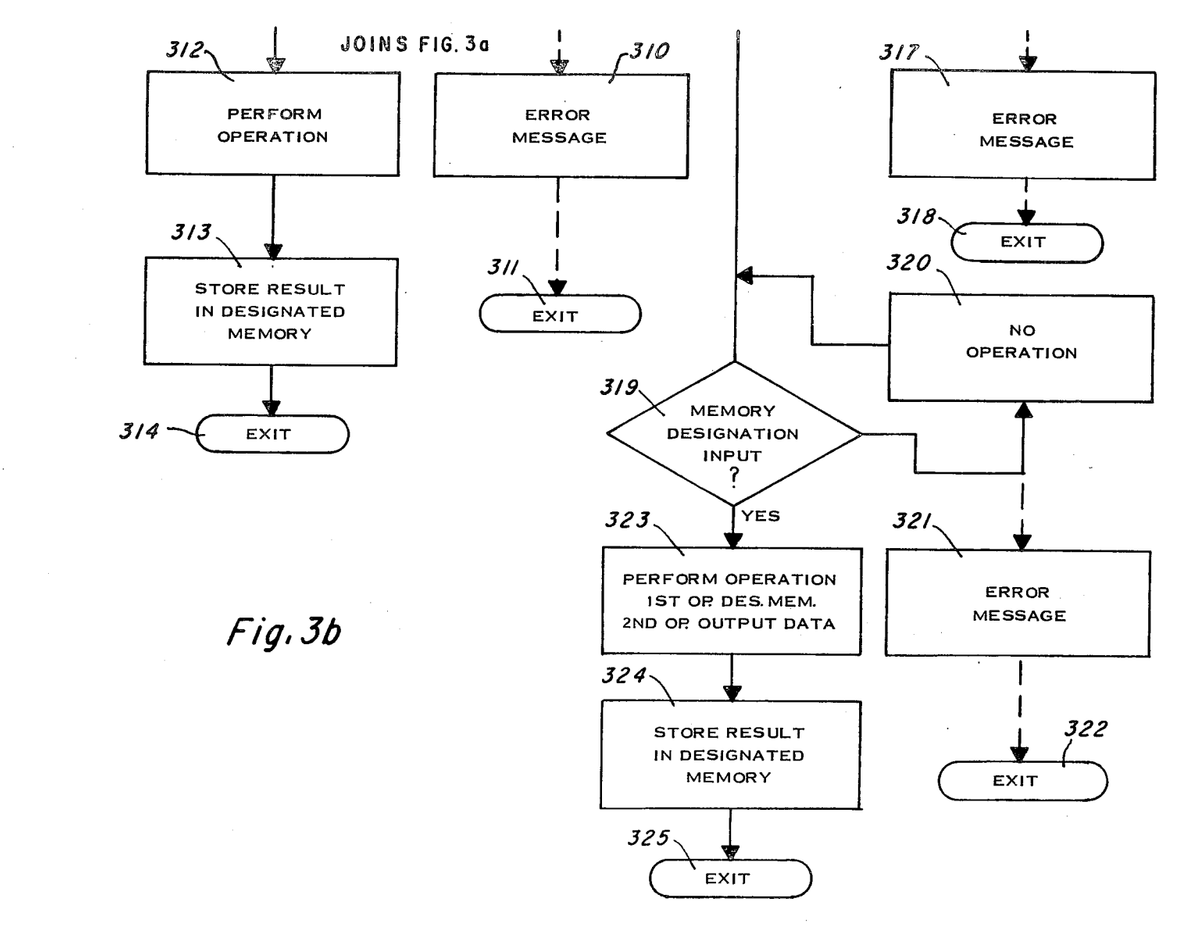

FIG. 3 (shown in parts 3a and 3b) illustrates a flow chart of the operation of a data processing apparatus having a plurality of user accessible memories which operates in accordance with the present invention. It should be understood that the operations illustrated in FIG. 3 represent only a portion of the operations performed by data processing apparatus 200 and that those machine operations not illustrated in FIG. 3 are conventional. Program 300 is entered through processing block 301. This entry point would generally be within an input decoding routine stored within read only memory 202. That is, entry into program 300 would take place as a normal function of determining the processes to be performed by apparatus 200 when an input is received. The program first checks to determine whether a store input is received (decision block 302). If no store input is received then the program 300 is not applicable and this program is exited via processing block 303. This exit point would attach to additional steps of input decoding in the normal process of the apparatus 200. If the received input signal is a store input then the program checks to determine whether the next received input is a memory designation input (decision block 304). If the next received signal is a memory designation input then the data currently being output is stored in the designated memory (processing block 305). This process corresponds to the normal memory storage routine known in the art. After the output value is stored in the designated memory, program 300 is exited via a processing block 306. This exit point would generally go to a state waiting for the next received input signal.

In the case in which the input received after the store input is not a memory designator key, the program then checks to determine whether or not the input is a unary operational command (decision block 307). If the received input is an unary operational command then the program tests to determine whether the next received input is a memory designation (decision block) 308). If the next received input is not a memory designation, then the input sequence is invalid and no operation is performed (processing block 309) by the apparatus ignoring the invalid input. Program 300 then returns to decision block 307. As an alternative the apparatus could be designed to generate an error message (processing block 301). After the error message is generated this program is exited via processing block 311. Generally the operator would next be required to clear the machine and reinitiate a valid input sequence. The selection of one of these two alternates is a design choice. In the event that the next received input signal was a memory designation then the apparatus performs the received unary operation (processing block 312). This received unary operation is performed using either the currrently output data stored in one of the working memories 206 as the operand or the data in the designated memory as the operand. The selection of one of these two alternatives is a design choice. Next the result of this operation is stored in the designated memory (processing block 313). Lastly, the program 300 is exited (processing block 314), generally to a state that will wait for the next received input.

In the event that the first received input after the store input is not a unary operation command, program 300 next tests to determine whether this received input is a binary operation (decision block 315). In the event that this input is not a binary operation command, an invalid entry sequence has been received. In this case no operation is performed (processing block 316) and the program returns to decision block 304 to await a valid input. Alternately, an error message may be generated (processing block 317) and program 300 is exited (processing block 318). If the received input following the store input is a binary operation command then the program 300 tests to determine whether the next received input is a memory designation (decision block 319). As in the case of a negative determination from decision block 308, if the next received input is not a memory designation than an improper input sequence has been received. Thus either no operation is performed (processing block 320) and the program returns to decision block 319 or an error message is generated (processing block 321) and program 300 is exited (processing block 322) according to the design option selected. If a valid memory designation input has been received then the data processing apparatus 200 performs the indicated operation (processing block 323). This binary operation is performed employing the data in the designated memory as the first operand and the data currently being output as the second operand. The result of this calculation is stored in the designated memory (processing block 324). The program 300 is then exited via processing 325, generally to a waiting state ready for the reception of the next input.

Figure 4:
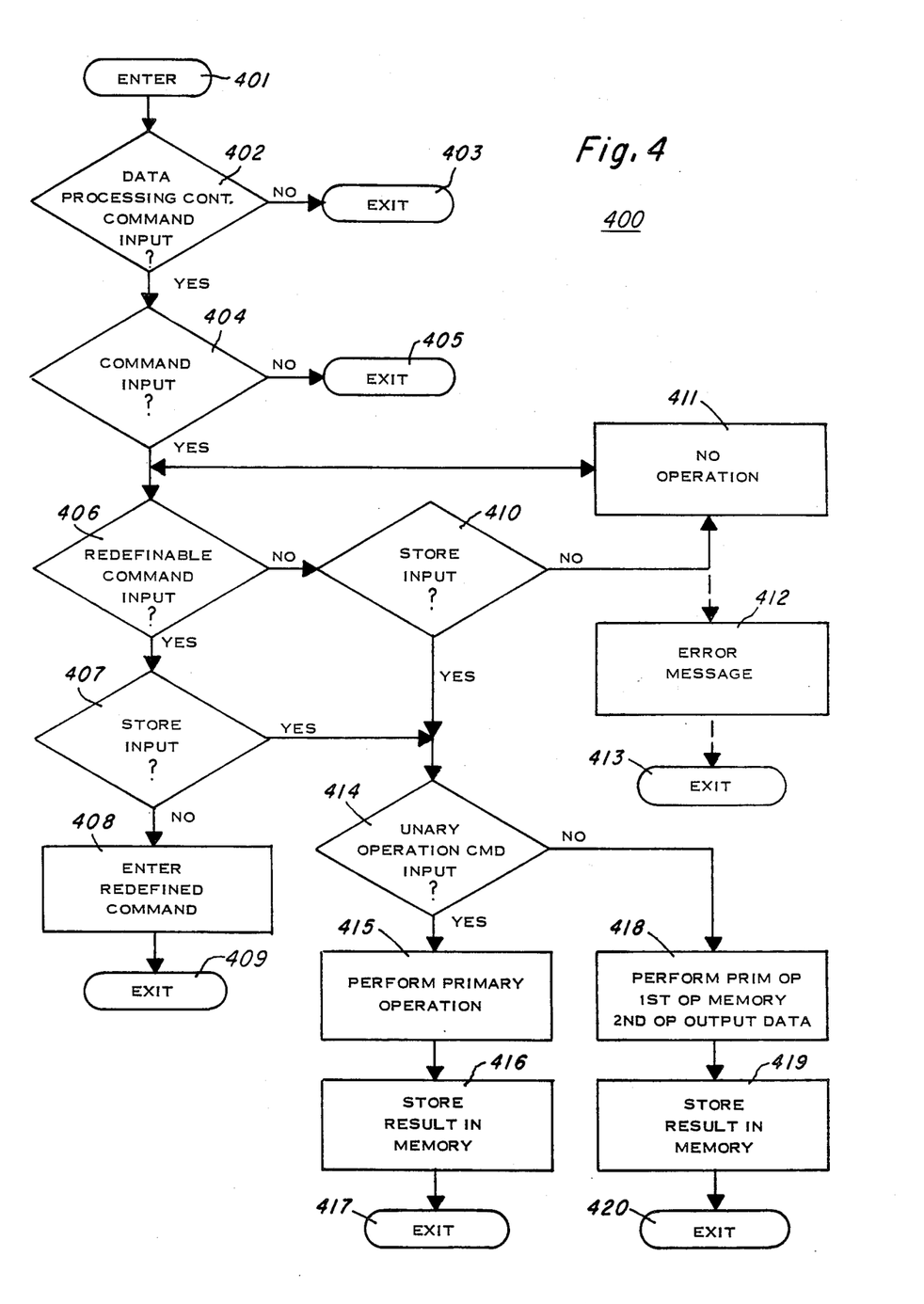
FIG. 4 illustrates a flow chart of one embodiment of the operation of a data processing apparatus in accordance with the present invention which has a single user accessible memory.

FIG. 4 illustrates one example of the operation of data processing apparatus 200 in accordance with the present invention in which only a single user accessible memory is available. Program 400 is entered via processing block 401. As in the case of program 300, this entry point is generally within a group of routines employed to decode the received input signals to determine what processes the apparatus should perform. Program 400 checks to determine whether the next received input is a data processsing control command (decision block 402). As noted above such a data processing control command could be a second function input, an inverse function input or a hyperbolic function input. In the event that such a data processing control command is not received then program 400 is exited via processing block 403. Program 400 tests to determine whether a command input is received (decision block 404) and if not program 400 is exited (processing block 405). If a command has been input, program 400 next checks to determine whether a redefinable operational command is received (decision block 406). As explained above in conjunction with a description of the command keys 108, each of the above mentioned data processing control commands are applicable to redefine the functions of only some of the command keys. If the next received command input is a redefinable command then program 400 tests determine whether a store input command is next received (decision block 407). If no such store input command is received then data processing apparatus 200 enters the redefined function to be performed in the ordinary course of operation (processing block 408). Then the program 400 is exited via processing block 409.

In the event that a redefinable command input is not received after the data processing control command input is received, then program 400 checks to determine if the next received input is a store command (decision block 410). If the next received input is not a store command, then an invalid input sequence has been received. Thus either no operation is performed (processing block 411) and the program returns to decision block 406 or an error message is generated (processing block 412) and program 400 is exited (processing block 413) according to the design option selected.

In the event that an input sequence including a data processing control command input, a command input and a store input is received whether or not the received command input is a redefinable command, program 400 checks to determine whether or not the received operation command was a unary operation command (decision block 414). If this received command input is a unary input, then the unary operation is performed on either the currently output data or the data in the user accessible memory as determined by the design option selected (processing block 415). Note in this case the primary operation is performed. Next the result of this operation is stored in the memory (processing block 416). Program 400 is then exited via processing block 417.

In the event that the received operation command input is not a unary operation, then it must be a binary operation. The program 400 then performs this binary operation (processing block 418). This binary operation is performed using the data in the memory as the first operand and the currently output data as the second operand. Note in this case also the primary operation is performed. Next the result of this operation is stored in the memory (processing block 419). Program 400 is then exited via processing block 420.

With proper selection of the permitted operations which can be combined with memory storage it is possible to simplify the above program 400 and eliminate interruption of the normal processes for operating on a redefinable command. If all those operations which are desired to be combined with memory store operations are not redefinable commands with respect to the particular data processing control command input used to initiate the input sequence, then operation is simplified. In such a case it not necessary to test whether a store input is received after a redefinable command input (decision block 407), because by definition no redefinable command can be combined with a storage operation. Thus if a redefinable command is received, program 400 next goes to processing block 408. If the received command is a nonredefinable command, then the program proceeds to decision block 410 as in the case illustrated in FIG. 4. This requirement would also serve to eliminate or at least reduce operator confusion as to the particular operation the data processing apparatus 200 is to perform depending upon the input sequence when a data processing control command input is generated.

Figure 5:
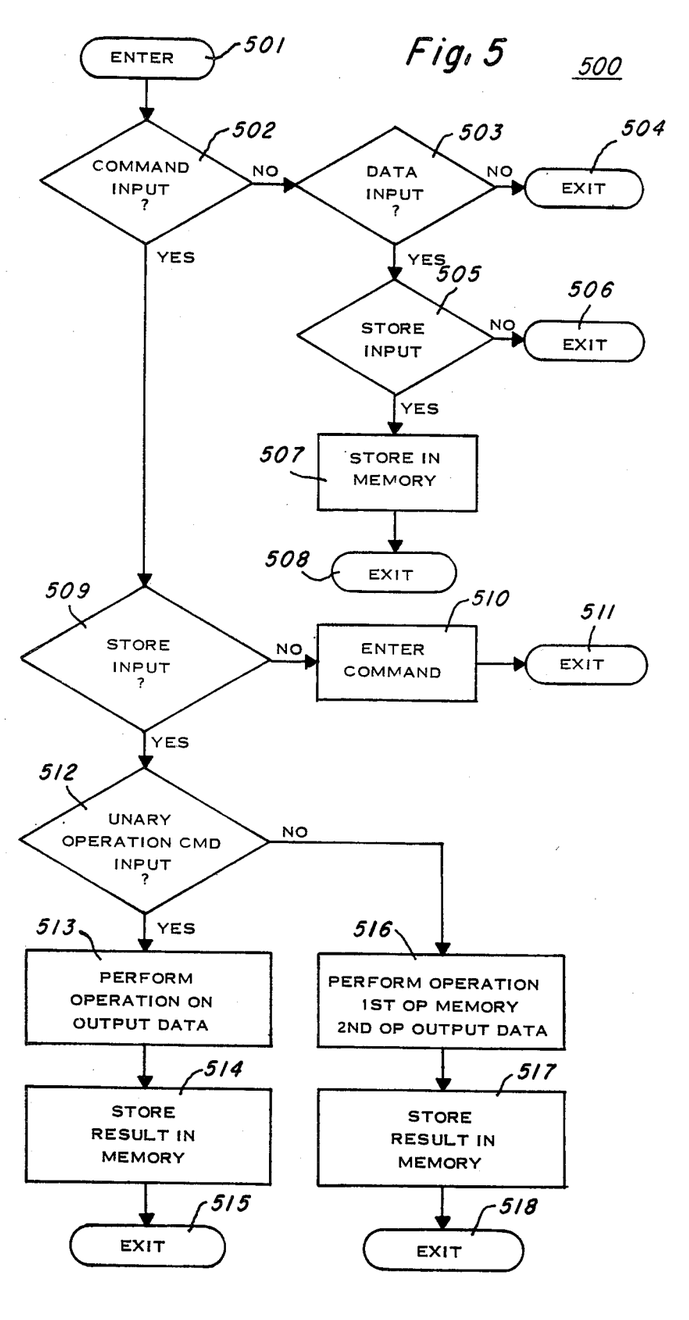
FIG. 5 illustrates a flow chart of an alternative embodiment of the operation of a data processing apparatus in accordance with the present invention which has a single user accessible memory.

Program 500 illustrated in FIG. 5 illustrates an alternative embodiment of the invention of the present application for use in a data processing apparatus having only a single user accessible memory. This embodiment does not employ a particular input in order to initiate the input sequence. Instead, the store input is recognized as a command to store the currently output data if the last received input before the store input was data, however, the store input is identified as a command to complete the previously input command and store the result in the memory when the store input is immediately preceeded by an command input.

Because no specific command input is employed to set off the input sequence initiating the combined operation and store function, this program 500 is not operable in all types of data processing apparatuses 200 which fall within the general definition of the class. In general there are two types of input operating sequences employed in data processing apparatuses of this type. The first operating sequence is an algebraic sequence in which data and command inputs, which may include left-hand and right-hand parentheses, are entered into the machine in the normal manner they are written on paper. This input sequence is characterized by the fact that binary operation command inputs are entered between the entry of the first and second operands. Thus the data processing apparatus cannot immediately operate on any command input because the second operand has not yet been entered. In the case of unary operations, such as the logarithmic and trigonometric functions, data processing apparatuses operating according to the algebraic entry sequence require entry of the unary operation prior to entry of the operand.

The algebraic entry sequence differs from the other generally employed entry sequence termed reverse Polish notation. In reverse Polish notation both operands of a binary operation are entered prior to entry of the binary operation command. The data processing apparatus is generally then programmed to immediately operate on any command input upon entry using the previously entered first and second operands. In addition, in the case of unary operations, these unary operations are entered into the machine after entry of the operand, and generally the machine is arranged to immediately calculate the result of the unary operation on the previously input data. It will be clear from a study of program 500 that this program is only applicable to data processing apparatuses which employ the algebraic entry sequence and cannot be used on calculators employing reverse Polish notation. In addition, some data processing apparatuses which employ the algebraic sequence for normal four function operations of addition, subtraction, multiplication and division employ an immediate operation in the manner of reverse Polish notation for the trigonometric and logarithmic functions. Program 500 is inapplicable to a data processing apparatus which employs any immediate operation function.

Program 500 is entered via entry block 501. The program first tests to determine whether a command input is received (decision block 502). In the event a command input is not received the program tests to determine whether a data input is received (decision block 503). In the event that a neither a command input nor a data input is received program 500 is exited (processing block 504). If a data input is received program 500 checks to determine whether the next received input is a store input (decision block 505). Program 500 is exited if such a store input is not received (processing block 506). If a store input is received immediately following a data input then the currently output data is stored in the memory (processing 507). This corresponds to the normal store command sequence of the machine. After the result is stored the program 500 is exited (processing 508).

In the event that a command input was received then program 500 checks to determine whether a store input is received (decision block 509). If such a store input is not received the received command input is stored in a pending operation memory (processing 510) in order that it may be performed in the proper order according to the normal operating sequence. Program 500 is then exited (processing 511).

In the event that a store input is received immediately following a command input, program 500 tests to determine whether the command input was a unary operation command (decision block 512). In the event that such a unary operation command was received, the unary operation is performed on the data currently output or on the data in the user accessible memory according to the design option selected (processing 513). Next the result of this operation is stored in the memory (processing block 514).

Lastly, program 500 is exited (processing 515).

If the received command input was not a unary operation then it was a binary operation. Program 500 performs that binary operation using the data stored in the memory as the first operand and the currently output data as the second operand (processing block 516). This result is stored in the memory (processing block 517) and the program is exited (processing block 518).

What is claimed is:

1. A data processing apparatus comprising:
an operator input means including means for entering data and means for entering operational commands, said operational commands including a plurality of unary data operation commands, a user accessible memory store command, a user accessible memory recall command, and a plurality of user accessible memory designation commands;

a plurality of user accessible memories for storing data therein, each user accessible memory corresponding to one of said user accessible memory designation commands;

an indicator memory for storing data therein;

an indicator means for generating an operator perceivable indication of said data stored in said indicator memory; and an arithmetic logic means, responsive to said operator input means and connected to each of said user accessible memories and said indicator memory, for storing entered data in said indicator memory, for performing entered unary data operation commands on the data stored in said indicator memory and storing the result in said indicator memory in response to entry of a sequence of operational commands consisting of a unary data operation command not preceeded by said user accessible memory store command, for storing data stored in said indicator memory in a selected one of said user accessible memories in response to entry of a sequence of operational commands consisting of said user accessible memory store command and said user accessible memory designation command corresponding to said selected user accessible memory, for storing data stored in a selected one of said user accessible memories in said indicator memory in response to entry of a sequence of operational commands consisting of said user accessible memory recall command and said user accessible memory designation command corresponding to said selected user accessible memory, and for performing a selected one of said unary data operation commands on the dta stored in said indicator memory and storing the result in said selected user accessible memory in response to entry of a sequence of operational commands comprising said user accessible memory store command, followed by said selected unary data operational command followed by said user accessible memory designation command corresponding to said selected user accessible memory.

2. A data processing apparatus comprising:

an operator input means including means for entering data and means for entering operational commands, said operational commands including a plurality of binary data operation commands, a user accessible memory store command, a user accessible memory recall command, and a plurality of user accessible memory designation commands;

a plurality of user accessible memories for storing data therein, each user accessible memory corresponding to one of said user accessible memory designation commands;

an indicator memory for storing data therein;

an indicator means for generating an operator perceivable indication of the data stored in said indicator memory; and an arithmetic means, responsive to said operator input means and connected to each of said user accessible memories and said indicator memory, for storing entered data in said indicator memory, for performing entered binary data operation commands on entered data and storing the result in said indicator memory in response to entry of a sequence of operational commands consisting of a binary data operation command not preceeded by a user accessible memory store command, for storing data stored in said indicator memory in a selected one of said user accessible memories in response to entry of a sequence of operational commands comprising said user accessible memory store command and said user accessible memory designation command corresponding to said selected user accessible memory, for storing data stored in a selected one of said user accessible memories in said indicator memory in response to entry of a sequence of operational commands comprising said user accessible memory recall command and said user accessible memory designation command corresponding to said selected user accessible memory, and for performing a selected one of said binary data operation commands on data stored in a selected one of said user accessible memories and said indicator memory and storing the result in said selected user accessible memory in response to entry of a sequence of operational commands comprising said user accessible memory store command, followed by said selected binary data operation command followed by said user accessible memory designation command corresponding to said selected user accessible memory.

3. A data processing apparatus comprising:

an operator input means including means for entering data and means for entering operational commands, said operational commands including a plurality of unary data operation commands, a user accessible memory store command and a user accessible memory recall command;

a user accessible memory for storing data therein;

an indicator memory for storing data therein;

an indicator means for generating an operator perceivable indication of the data stored in said indicator memory; and an arithmetic means, respjonsive to said operator input means and connected to said user accessible memory and said indicator memory, for storing entered data in said indicator memory, for performing entered unary data operation commands on the data stored in said indicator memory and storing the result in said indicator memory in response to entry of a sequence of operational commands including said unary data operation command and not including said user accessible memory store command, for storing the data stored in said indicator memory in said user accessible memory in response to entry of said memory store command, for storing the data stored in said user accessible memory in said indicator memory in response to entry of said memory recall command, and for performing a selected one of said plurality of unary data operation commands on the data stored in said indicator memory and storing the result in said user accessible memory in response to entry of a sequence of operational commands comprising said selected unary data operation command immediately followed by said user accessible memory store command.

4. A data processing apparatus as claimed in claim 3, wherein:

said operator input means further includes means for entering a data processing control operational command; and said sequence of operational commands for performing a selected unary data operation command on the data stored in said indicator memory and storing the result in said user accessible memory consists of said data processing control operational command, said unary data operation command and said user accessible memory store command.

5. A data processing apparatus as claimed in claim 4, wherein:
said data processing control operational command is a second functional command for redefining the next entered operational command to a second functional operation.

6. A data processing apparatus as claimed in claim 4, wherein:
said data processing control operational command is an inverse function command for redefining the next entered operational command to a functional operation the inverse of the primary functional operation of the operational command.

7. A data processing apparatus comprising:
an operator input means including means for entering data and means for entering operational commands, said operational commands including a plurality of binary data operation commands, a user accessible memory store command, and a user accessible memory recall command;
a user accessible memory for storing data therein;
an indicator memory for storing data therein;
an indicator means for generating an operator perceivable indication of the data stored in said indicator memory; and
an arithmetic means, responsive to said operator input means and connected to said user accessible memory and said indicator memory, for storing entered data in said indicator memory, for performing entered binary data operation commands on entred data and storing the results in said indicator memory in response to entry of a sequence of operational commands including said binary data operation command and not including said user accessible memory store command, for storing the data stored in said indicator memory in said user accessible memory in response to entry of said user accessible memory store command, for storing the data stored in said user accessible memory in said indicator memory in response to entry of said user accessible memory recall command, and for performing a selected one of said binary data operation commands on said data stored in said user accessible memory and said indicator memory and storing the result in said user accessible memory in response to entry of a sequence of operational commands comprising said selected binary data operation command immediately followed by said user accessible memory store command.

8. A data processing apparatus as claimed in claim 7, wherein:
said operator input means further includes means for entering a data processing control operational command; and
said sequence of operational commands for performing a selected binary data operation command on the data stored in said indicator memory and said user accessible memory and storing the result in said user accessible memory consists of said data processing control operational command, said binary data operation command and said user accessible memory store command.

9. A data processing apparatus as claimed in claim 8, wherein:
said data processing control operational command is a second functional command for redefining the next entered operational command to a second functional operation.

10. A data processing apparatus as claimed in claim 8, wherein:
said data processing control operational command is an inverse function command for redefining the next entered operational command to a functional operation the inverse of the primary functional operation of the operational command.

11. A data processing apparatus comprising:
an operator input means including means for entering data and means for entering operational commands, said operational commands including a plurality of unary data operation commands, a user accessible memory store command, a user accessible memory recall command, and a plurality of user accessible memory designation commands;
a plurality of user accessible memories for storing data therein, each user accessible memory corresponding to one of said user accessible memory designation commands;
an indicator memory for storing data therein;
an indicator means for generating an operator perceivable indication of said data stored in said indicator memory; and
an arithmetic logic means, responsive to said operator input means and connected to each of said user accessible memories and said indicator memory, for storing entered data in said indicator memory, for performing entered unary data operation commands on the data stored in said indicator memory and storing the result in said indicator memory in response to entry of a sequence of operational commands consisting of said unary data operation command not preceeded by said user accessible memory store command, for storing data stored in said indicator memory in a selected one of said user accessible memories in response to entry of a sequence of operational commands consisting of said user accessible memory store command and said user accessible memory designation command corresponding to said selected user accessible memory, for storing data stored in a selected one of said user accessible memories in said indicator memory in response to entry of a sequence of operational commands consisting of said user accessible memory recall command and said user accessible memory designation command corresponding to said selected user accessible memory, and for performing a selected one of said unary data operation commands on the data stored in a selected one of said user accessible memories and storing the result in said selected user accessible memory in response to entry of a sequence of operational commands comprising said user accessible memory store command, followed by said selected unary data operation command followed by said user accessible memory designation command corresponding to said selected user accessible memory.

12. A data processing apparatus comprising:
an operator input means including means for entering data and means for entering operational commands, said operational commands including a plurality of unary data operation commands, a user accessible memory store command and a user accessible memory recall command;

a user accessible memory for storing data therein;

an indicator memory for storing data therein;

an indicator means for generating an operator perceivable indication of the data stored in said indicator memory; and an arithmetic means, responsive to said operator input means and connected to said user accessible memory and said indicator memory, for storing entered data in said indicator memory, for performing entered unary data operation commands on the data stored in said indicator memory and storing the result in said indicator memory in response to entry of a sequence of operational commands including said unary data operation command and not including said user accessible memory store command, for storing the data stored in said indicator memory in said user accessible memory in response to entry of said user accessible memory store command, for storing the data stored in said user accessible memory in said indicator memory in response to entry of said user accessible memory recall command, and for performing a selected one of said plurality of unary data operation commands on the data stored in said user accessible memory and storing the result in said user accessible memory in response to entry of a sequence of operational commands comprising said selected unary data operation command immediately followed by said user accessible memory store command.

13. A data processing apparatus as claimed in claim 12, wherein:

said operator input means further includes means for entering a data processing control operational command; and said sequence of operational commands for performing a selected unary data operation command on the data stored in said user accessible memory and storing the result in said user accessible memory consists of said data processing control operational command, said unary data operation command and said user accessible memory store command.

14. A data processing apparatus as claimed in claim 13, wherein:

said data processing control operational command is a second function command for redefining the next entered operational command to a second functional operation.

15. A data processing apparatus as claimed in claim 13, wherein:

said data processing control oeprational command is an inverse function command for redefining the next entered operational command to a functional operation the inverse of the primary functional operation of the operational command.

* * * * *